F. L. KRYDER.
CORD TIRE.
APPLICATION FILED OCT. 18, 1919.

1,357,098.

Patented Oct. 26, 1920.

F. L. Kryder, Inventor

By E. E. Vrooman & Co., his Attorneys

UNITED STATES PATENT OFFICE.

FRANK L. KRYDER, OF AKRON, OHIO.

CORD TIRE.

1,357,098.   Specification of Letters Patent.   Patented Oct. 26, 1920.

Application filed October 18, 1919. Serial No. 331,521.

*To all whom it may concern:*

Be it known that I, FRANK L. KRYDER, a citizen of the United States, residing at Akron, in the county of Summit and State of Ohio, have invented certain new and useful Improvements in Cord Tires, of which the following is a specification, reference being had therein to the accompanying drawings.

This invention relates to fabric cord or cord tires, and the object of the invention is the improvement of the construction of casings of cord tires, whereby a very durable and efficient casing is produced that will last a comparatively long time, and which is comparatively inexpensive to manufacture.

With this and other objects in view, my invention comprises certain novel constructions, combinations, and arrangements of parts as will be hereinafter specifically described, illustrated in the accompanying drawings, and more particularly pointed out in the appended claims.

Figure 1:
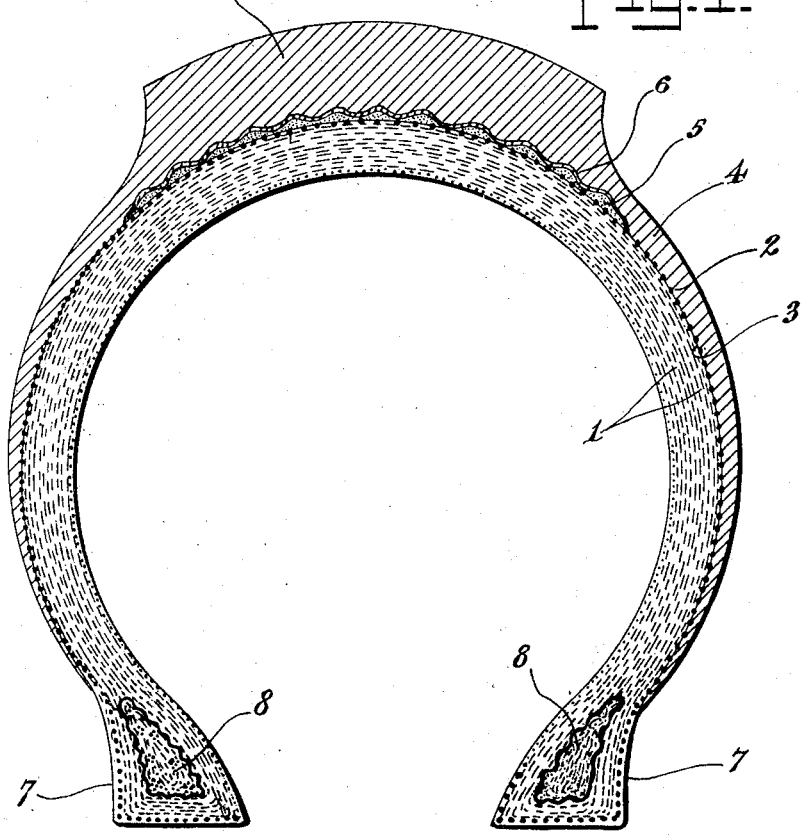
Figure 1 is a sectional view of the casing constructed in accordance with the present invention.
Figure 2:
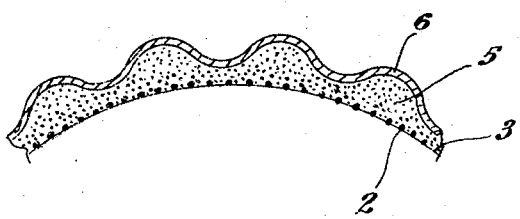
Fig. 2 is a fragmentary, enlarged sectional view of the casing.

Referring to the drawings by numerals, (Fig. 3) 1 designates the plies of treated cord fabric coated with a rubber compound. 2 is a layer of heavy cords, each cord being coated with a heavy coat of rubber compound so that each cord is well insulated from each other; 3 represents a ply of rubber compound between layers 1 and 2. This ply 3 serves as a shock distributer and also helps to bind all the layers together.

Figure 3:
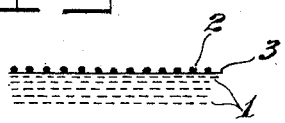
Fig. 3 represents a sectional view of the fabric of the casing.

By using heavier cords spaced a greater distance apart as shown at 2 in Fig. 3, a stronger casing is produced, for a better union is made with the outer cover 4 and the cushion 5.

One of the causes of so many treads or outer covers separating from the remaining layers or sections as a whole, is due to the fact that the outer cover separates from the inner or under layers and the breaker cushion 5; this caused by the cords composing the plies of fabric being so close together that the amount of rubber compound on top of each thread or cord has not sufficient strength to hold the cords, and the result is separation or loosening of the cords with respect to each other.

A casing constructed of say five or six plies of cord fabric (Figs. 1 and 3), treated with cement and coated with a rubber compound as shown in Fig. 3, has great strength because the threads or cords are close together, and then by placing one ply of cord fabric or cords of a larger size running in the same direction, well insulated with rubber, a casing of superior wearing quality is obtained, because the heavier threads or cords placed farther apart makes the strong union with the cushion 5 and the outer cover 4.

Between the cushion 5 and the outer cover 4, corrugated sheet 6 is interposed, hence making the cushion 5 corrugated, and this corrugated structure prevents pealing off from the inner layers and the outer cover of the casing; in other words, if a stock is run corrugated, and a loose spot develops, the tread will not loosen up as when the stock is run smooth or uncorrugated. Considerable trouble has been experienced with the tread or outer cover loosening up from the cushion, also the breaker loosening up from the cushion, as well; this trouble is experienced when tires of a second or third grade are used, more than in high grade tires; yet, by my improved invention, this trouble or imperfection is practically entirely eliminated.

The bead portions 7 of the casing are provided with a corrugated inclosed core 8, which core comprises a central filling with a corrugated casing surrounding the same, and around this core and casing are the layers of the casing proper; the layers of the casing, corrugated casing and core, complete the bead portions. The corrugated bead portions are very durable and strong, for the corrugated casings of the bead core prevent a common trouble known as "slipping beads" and "bead blow-outs." The corrugated sheet 6 is also known as the breaker, and 9 is the tread of the tire.

What I claim is:

1. In a cord tire casing, the combination of a plurality of inner layers or plies, a layer or ply of well-spaced cords or threads incased in a rubber compound, a corrugated cushion integral with the well-spaced cords, a corrugated sheet or breaker integral with the well-spaced cords, said corrugated sheet or breaker integral with the corrugated cushion, and an outer cover including a tread integral with the inner layers and immediately assembled with the well-spaced cords and with the corrugated breaker or sheet, substantially as shown and described.

2. In a cord tire casing, the combination of an inner ply of cords, an intermediate ply of well-spaced cords held together by a rubber compound, a cushion against said well-spaced cords, a corrugated sheet or breaker resting against said cushion, and an outer cover having a tread resting upon the well-spaced cords and the tread resting down on and conforming to the shape of the corrugated sheet against the cushion.

3. In a cord tire casing, the combination of a series of inner layers composed of cord fabric, a ply of rubber compound against the inner portion of said layers, well-spaced threads or cords positioned against said ply, a rubber compound holding said well-spaced cords in their spaced position close to said ply of rubber compound, a cushion against said well-spaced cords, a corrugated sheet or breaker over said cushion and resting against the same, an outer cover provided with a thread portion resting against said well-spaced cords, and said tread of less width than said corrugated sheet or breaker, whereby the tread is cushioned throughout its entire width and to its extreme edge.

In testimony whereof I hereunto affix my signature.

FRANK L. KRYDER.